(12) United States Patent
Syrovy

(10) Patent No.: US 8,866,325 B2
(45) Date of Patent: *Oct. 21, 2014

(54) LOOPED AIRFOIL TURBINE

(71) Applicant: Everlift Wind Technology Inc., Lewes, DE (US)

(72) Inventor: George J. Syrovy, Centerville, MA (US)

(73) Assignee: Everlift Wind Technology Inc., Lewes, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/098,119

(22) Filed: Dec. 5, 2013

(65) Prior Publication Data
US 2014/0091578 A1    Apr. 3, 2014

Related U.S. Application Data

(63) Continuation of application No. 13/203,745, filed as application No. PCT/US2010/026054 on Mar. 3, 2010, now Pat. No. 8,618,682.

(60) Provisional application No. 61/309,601, filed on Mar. 2, 2010, provisional application No. 61/157,093, filed on Mar. 3, 2009.

(51) Int. Cl.
  *F03D 9/02*    (2006.01)
  *F03D 5/02*    (2006.01)
  *F03D 9/00*    (2006.01)

(52) U.S. Cl.
  CPC ............ *F03D 9/002* (2013.01); *Y02E 10/70* (2013.01); *F05B 2260/79* (2013.01); *Y02E 10/725* (2013.01); *F03D 5/02* (2013.01); *F05B 2260/76* (2013.01)
  USPC .............................................. 290/44; 290/55

(58) Field of Classification Search
  USPC ...................................................... 290/44, 55
  See application file for complete search history.

(56) References Cited

U.S. PATENT DOCUMENTS

| | | | |
|---|---|---|---|
| 4,134,469 A | 1/1979 | Davis | |
| 7,075,191 B2 | 7/2006 | Davison | |
| 7,750,491 B2 | 7/2010 | Sankrithi | |
| 8,618,682 B2 * | 12/2013 | Syrovy | 290/44 |
| 2008/0303287 A1 | 12/2008 | Meheen | |
| 2011/0148120 A1 | 6/2011 | Liao | |

* cited by examiner

*Primary Examiner* — Tho D Ta
(74) *Attorney, Agent, or Firm* — Polster, Lieder, Woodruff & Lucchesi, L.C.

(57) ABSTRACT

A turbine with a basic system of a triangular structure (14) utilizing both lift and drag aerodynamic forces produced by fluid flow energy. The entire triangular structure (14) could either yaw to always face the wind direction (W) or stay in a fixed position. The system (10) uses airfoil blades (12) shaped like an airplane wing, traveling linearly on travel wheels (22) riding on travel tracks (50, 52, 54). While traveling up, the wings are powered by a positive lift force and drag force while using negative lift force and drag force when traveling downward. All wings (12) are connected by a segmented chain (16) which transfers the kinetic power of wheeled wing carriages (18) directly to multiple generators (26), requiring no gears.

19 Claims, 5 Drawing Sheets

LOOPED AIRFOIL TURBINE

RELATED APPLICATIONS

This application is a continuation of pending application U.S. Ser. No. 13/203,745, filed Aug. 29, 2011 (Section 371 date), which is a national stage application under 35 U.S.C. §371 of PCT application US/2010/026054, filed Mar. 3, 2010. That application is related to U.S. Provisional Patent Application No. 61/157,093, filed Mar. 3, 2009, and U.S. Provisional Patent Application No. 61/309,601, filed Mar. 2, 2010, from both of which priority is claimed. The disclosures of all these applications are hereby incorporated by reference.

TECHNICAL FIELD

This invention relates to a device for extracting power, preferably electrical power, from wind.

BACKGROUND ART

Conventional wind turbines are powered by a rotor with blades shaped and arranged similarly to a helicopter rotor. The blade profile of a conventional wind turbine's rotor varies along its length, similar to a helicopter rotor. This makes production of the rotor blades very complex and expensive. Moreover, mechanisms to turn the turbine into the wind are complex and subject to constant maintenance.

SUMMARY OF THE INVENTION

Looped AirFoil Wind Turbine (LAWT) is a novel wind turbine utilizing aerodynamic forces produced by wind energy, creating a new class of alternative wind energy turbines. The LAWT system uses the lift and drag forces produced by wind acting on its blades, and may be implemented without the use of electric motors and drives for yaw control. The LAWT system uses blades shaped like segments of an airplane wing, traveling linearly rather than rotating.

LAWT utilizes physics identical to an airplane wing's lift and drag concept. Wind movement over a wing (airfoil) produces the largest possible lift force, which cannot be matched by any rotor blade. The inherent advantages over all existing technologies are deeply rooted in the basic physics. Superior scalability over rotational wind turbines is due to inherent energy density. The resulting superior performance versus price (cost/kilowatt) opens new array or stand-alone markets both on- and off-shore.

In a LAWT system, the three long blades of a typical conventional rotor are replaced by many shorter wing segments. In effect, each rotor blade is reshaped into several more efficient wing segments with a traditional wing profile. Each wing segment has a constant profile along its entire length, greatly reducing the manufacturing costs when compared to the blades of the wind turbine's rotor where the blade profile varies along its length. The LAWT wing segments can be either symmetrical or asymmetrical leading to various trade-offs useful in the different market niches.

The LAWT wing segments are positioned with parallel, generally horizontal spanwise leading edges above each other, traveling up and down in a generally triangular path. When traveling up, the wings are powered by a positive aerodynamic lift force and drag force. When traveling down, the wings may be powered by a negative lift force and drag force. For symmetrical profiled wings (camber=0) the wing pitch is also symmetrical. While traveling up, wing pitch is positive, equaling for example +15 to +18 degrees; while traveling down, wing pitch is negative, equaling for example −15 to −18 degrees. For asymmetrical profiled wings, the wing pitch will again be positive while traveling up, but wing pitch while traveling down is less important. Preferably, the relative lift force and drag force are chosen to urge the wing, when traveling up, to travel upward and rearward in the direction of the path. Ideally, the wing, when traveling down, provides negative lift and drag which urge the wing to move downward and rearward in the direction of the path, although this is less important.

The wing segments are the major parts of carriages which are interconnected to each other in a continuous loop. The term "carriage" is used broadly herein to indicate the wing and whatever other elements are attached to it and move with it as a unit. The carriages are preferably connected to each other by a continuous belt or chain. The carriages preferably have wheels and travel on a triangular track, although it is possible for the belt or chain to be merely trained over sheaves or sprockets held by a frame.

In an embodiment, all wings travel on wheels, such as rollercoaster-like wheels or small (wheelbarrow-like) tires riding on "travel tracks." The wings are connected, as by a segmented chain which transfers the kinetic power of wheeled wings directly to multiple generators, requiring no gears. The number of wing segments is limited only by the length of the device's travel tracks. Each wing is attached at both ends making the construction sturdier and less expensive. Additionally, the LAWT system is fully scalable. Its height and width can be scaled independently.

A) Automatic Pitch Adjustment Mechanism

Symmetrical wings (airfoils) preferably maintain a pitch (angle of attack) of approximately +15° on their way up and −15° on the way down. This could be done by some active electric actuators similar to a rudder aileron actuator of most airplanes. Such "active" approach requires an input of electric energy with additional more complex parts (motors). Several superior "passive" solutions will be outlined. The LAWT configuration typically requires an additional set of wheels for each airfoil running inside an essentially parallel track to the track for the main airfoil wheels. No additional energy source (besides the wind energy) would be required. Slight gradual changes in the distance between these tracks will result in the "angle of attack" settings anywhere from +20° to −20° with respect to the horizontal direction.

With asymmetrical (cambered airfoil) profiled wings, no pitch adjustment mechanism will be required and pitch may be fixed. Cambered airfoils have an advantage of almost doubling the lift performance of symmetrical airfoils in the positive pitch range, but are very inefficient as "spoilers" in the negative pitch range. Lift force and drag force will be provided by the ascending wings in the front while descending wings will provide largely drag force and some smaller non-aerodynamic ("barn door") negative lift.

B) Multiple Wing Modules (Similar to Bi-Planes or Tri-Planes)

Single wings typically require up to 4 wheels each. To reduce the total number per one system, it may be advantageous to "group" 2 or more wings closer together on a single 4-wheel rectangular frame. Such airfoil "grouping" will be aerodynamically similar to old bi-planes or tri-planes, resulting in maximum lift-force density per square meter of the frontal area and overall reduction of moving parts.

C) Supplemental Drag Surfaces

The four-wheeled rectangular frame serving as a mounting mobile platform for several wings each could also serve as a mounting platform for drag enhancement device in the form of rigid flat plates or hollowed half-cylinders with maximum drag coefficient. It could supplement the drag of a pitched wing, as needed, to balance and optimize the lift/drag composed vector direction.

D) Yaw Mechanism

Optional yaw mechanism will be at the bottom of the triangular structure. As usual, such mechanism insures a proper orientation to face the wind. Conventional yaw implementations are possible, but they generally involve expensive planetary gears. The wide base of the structure opens the possibility of unconventional implementations, for example, a circular arrangement of car tires riding in a wide circle with the diameter similar to the base length or width. Although a conventional rudder may be used, rudderless yaw may be achieved by an off-center yaw rotation. By placing the yaw rotation center (the center of rotation of the base around a vertical axis) ahead of the center of the triangular structure, the device will automatically orient itself with the ascending wings facing the wind. It also eliminates the need to lock the yaw position of the device as is required by a conventional wind turbine.

E) Types of Wings

LAWT airfoils could be either symmetrical or asymmetrical, leading to various trade-offs, useful in the different markets. Asymmetrical airfoils could be either simple airfoils or multi-segmented with slats and flaps. The angle of attack (pitch) of symmetrical LAWT airfoils is likely to be set in the range from +18° to −18°, to avoid a stall condition, while asymmetrical airfoils are likely to be set in a more narrow range of angles. The LAWT market ranges from individual small wind machines placed on commercial or home rooftops to large utility-sized onshore or offshore arrays.

The LAWT system prefers a plain cambered asymmetrical airfoil with a great lift capability.

F) Gearless Drive System

It is desirable to avoid gears due to their fragility and wear and tear over time. In a LAWT system, a secondary driving chain drives the sprocket wheels and the sprocket wheels provide a direct drive for the multiple generators. Transfer load is distributed over several "force transfer points" and several generators. Both the primary and secondary chains could be made of metal or hardened rubber.

Other aspects of the invention will be better understood in light of the following description and claims and the accompanying drawing.

BRIEF DESCRIPTION OF THE DRAWINGS

In the accompanying drawings which form part of the specification.

BEST MODE FOR CARRYING OUT THE INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Figure 1:
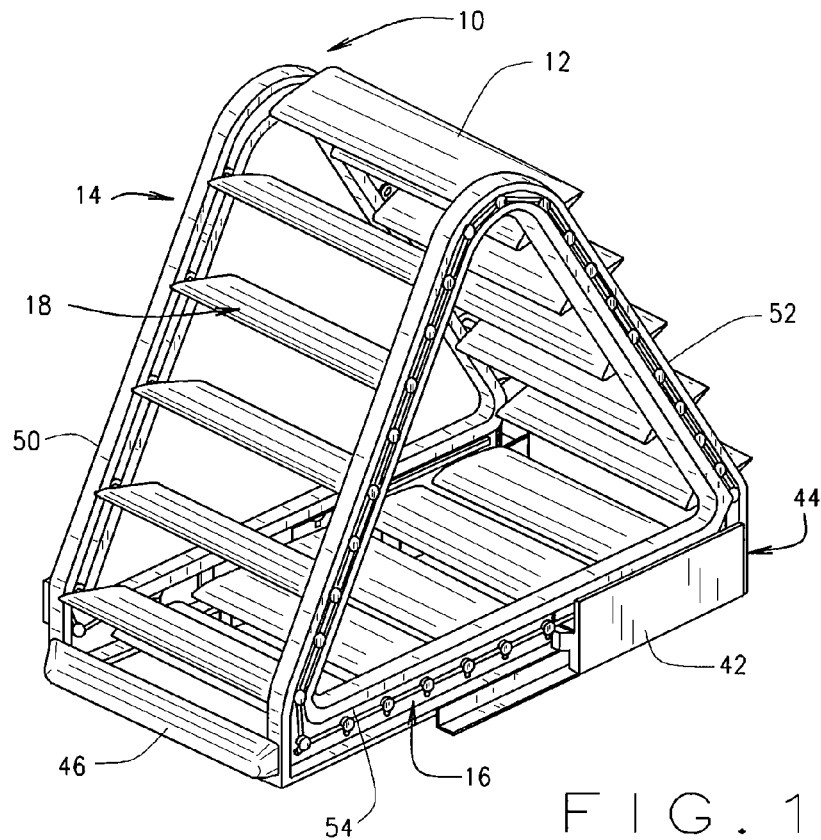
FIG. 1 is a view in upper left perspective of a LAWT wind turbine without yaw control.
Figure 2:
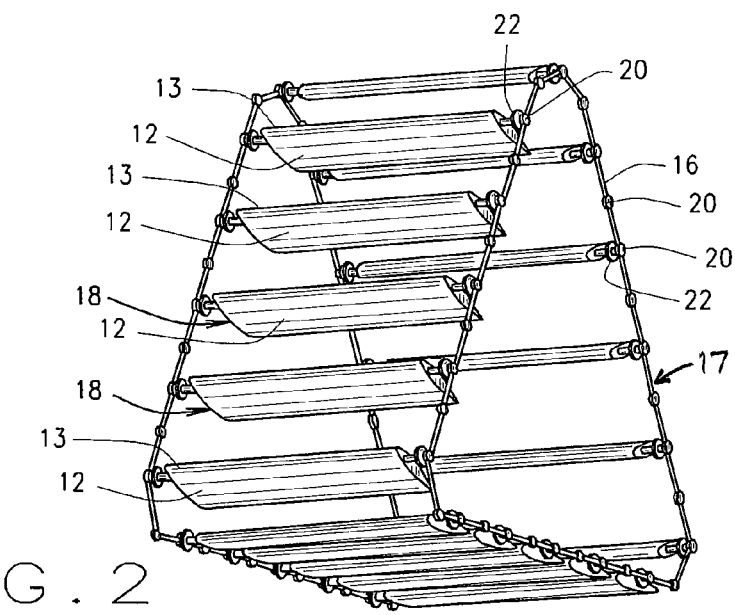
FIG. 2 is a view in lower left perspective of a LAWT wing subassembly.

As shown in FIGS. 1 and 2, a LAWT system 10 of the present invention replaces the three long blades of the typical conventional rotor with many shorter wing segments 12 which move linearly around a triangular support structure 14. The wing segments 12 are the major parts of carriages 18 which are interconnected to each other by a chain 16 in a continuous loop 17. The chain 16 is articulated, as at 20, to permit it to travel smoothly around rounded apexes of the triangular support structure 14. Each carriage 18 has a traveling wheel 22 at each end. The wheels 22 are constructed to ride on a track, as described below.

The LAWT 10 system is based on everyday science proven many times over in every aircraft. The wing segments 12 are profiled with a certain angle of attack relative to the horizontal wind. The ascending wing segments 12 are driven by a lift/drag force vectored in "northeast" direction and are pitched with an angle of attack ranging from 0° to +18°. The descending wing segments 12 are driven by a lift/drag force vectored in "southeast" direction and are pitched with an angle of attack ranging from 0° to −18°.

Calculations so far indicate that the optimal shape of the LAWT 10 triangular track support structure 14 is an equilateral triangle with all angles equal to 60°. It is therefore desirable that the combined force of lift and drag vectors equal 60°. It will be understood that triangles having other angles may also be used, the preferred angles being in the range of 45° to 75°.

The LAWT 10 support structure 14 is composed two spaced-apart triangles, each made of three tracks: an ascending track 50, a descending track 52 and a generally horizontal return track 54, which together provide a stable continuous track for the force-generating wings 12 and carriages 18. The wheeled carriages 18 are positioned evenly above each other on the triangular support structure with the leading edges 13 of wings 12 parallel and the wheels 22 riding on the tracks. When ascending, the wing segments 12 are powered by a positive lift force and drag force. When descending, the wing segments 12 are powered by a drag force and may be powered by a negative lift force.

The traveling wheels 22 are preferably rollercoaster-like flanged wheels or small (wheelbarrow-like) tires. The wheeled carriages 18 are connected by a segmented chain 16 which transfers the kinetic power of the wing segments 12 directly to multiple generators 26, requiring no gears. The segmented chain 16 binds all the wheeled carriages 18 together so they can act like a team of "pulling horses".

Figure 5:
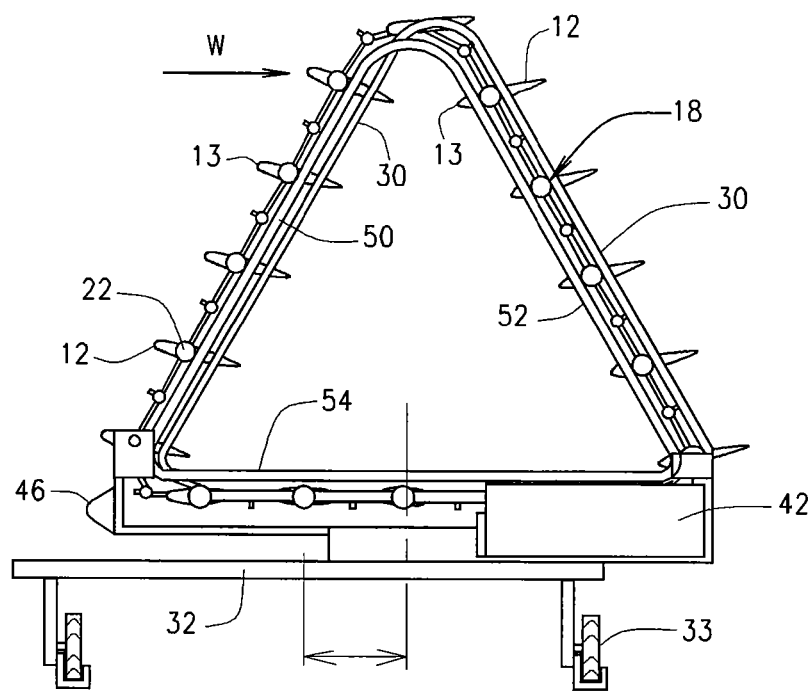
FIG. 5 is a view in side elevation of a LAWT with a self-aligning yaw rotating platform, the LAWT having symmetrical wing segments and an automatic pitch adjustment mechanism.
Figure 5A:
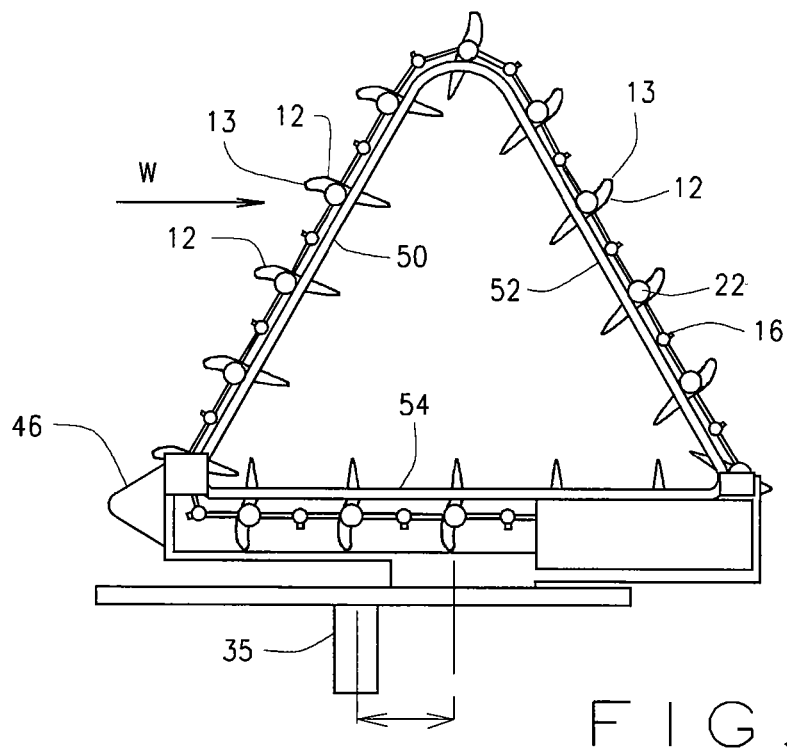
FIG. 5A is a view in side elevation of a LAWT with a self-aligning yaw rotating platform, the LAWT having asymmetrical wings.

As shown in FIGS. 1, 5, and 5A, the support structure 14 also has a housing 44 for the gearless drive mechanism 48 (see FIG. 3) for lateral to rotational movement conversion; a pair of nacelles 42 to house the generators 26; and a front wind shield 46 to prevent any drag force on the wing segments 12 on the returning track 54.

Figure 3:
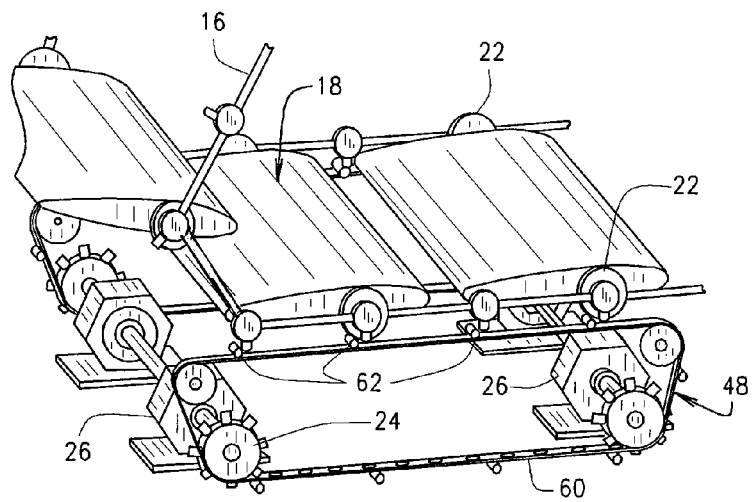
FIG. 3 is a view in upper left perspective of a LAWT gearless generator drive system.

It is desirable to avoid gears because of their fragility and wear and tear over time. As shown in FIG. 3, in a LAWT 10 system, a secondary driving chain 60 drives the sprocket wheels 24 and the sprocket wheels 24 provide a direct drive for the multiple generators 26. Secondary driving chain could be attached directly to the primary driving chain or preferably (as shown in FIG. 3) indirectly coupled with the primary chain. Transfer load is distributed over several "force transfer points" 62 and several generators 26. Both the primary chains 16 and secondary chains 60 could be made of metal or hardened rubber.

LAWT 10 symmetrical (camber =0) wing segments 12 are likely to be set in the range from +18° to −18° and would produce no lift when at the "zero angle" position. For symmetrical profiled wing segments 12 the wing pitch is also symmetrical, that is, the pitch of the wing on the descending track 52 is preferably set at the negative of the pitch of the wing while on the ascending track 50.

Figure 4:
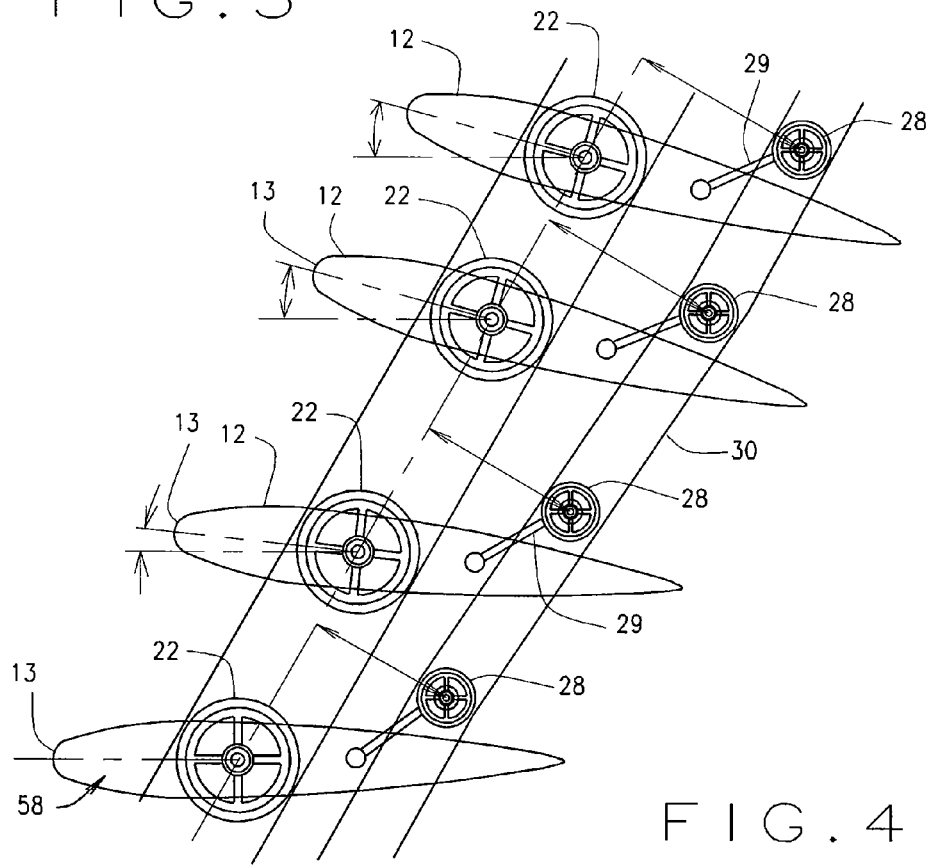
FIG. 4 is a diagrammatic view in side elevation of a portion of a LAWT pitch automatic adjustment mechanism.

Particularly with a symmetrical (zero camber) wing segment, all wing segments (airfoils) 12 need to maintain a pitch (angle of attack) of approximately +15° on their ascent and −15° on descent. This could be done by some active electric actuators similar to a rudder aileron actuator of most airplanes. Such "active" approach requires an input of electric energy with additional more complex parts (motors). A "passive" solution is shown in FIGS. 4 and 5. As shown these Figures, an illustrative LAWT 10 configuration utilizes an additional set of wheels 28 for each airfoil. The wheels 28 are connected by links 29 to the wing segments 12 and run loosely inside an essentially parallel track 30 to the tracks 50, 52, 54 for the main airfoil wheels 22. No additional energy source (besides the wind energy) would be required. Slight gradual changes in the distance between these tracks will allow the "angle of attack" (pitch) to be set anywhere from +20° to −20° with respect to the horizontal direction. As the wing 12 ascends the track 50, its shape and positive pitch create lift and drag in accordance with well-known principles. As it descends the track 52, its shape and negative pitch create drag and negative lift. Therefore, the wing 12 creates a substantial force, causing the loop 17 to rotate clockwise as viewed in FIG. 5, both on the ascending and the descending tracks.

Figure 6:
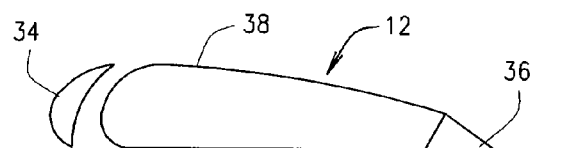
FIG. 6 is a diagrammatic view in cross-section of a multi-segmented asymmetric airfoil with a slat and flap for use in a LAWT.
Figure 6A:
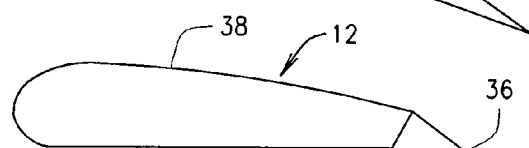
FIG. 6A is a diagrammatic view in cross-section of an asymmetric airfoil with a flap for use in a LAWT.
Figure 6B:
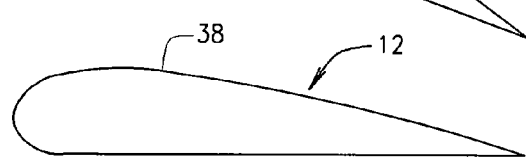
FIG. 6B is a diagrammatic view in cross-section of a simple asymmetric airfoil for use in a LAWT.

The LAWT 10 system prefers a plain cambered asymmetrical wing segment 12 with a great lift capability, as shown in FIGS. 5A and 6B, where the airfoil shape is identified as 38. Asymmetrical (cambered) airfoils (indicated as airfoil shape 38 in FIG. 6C) have an advantage of almost doubling the lift performance of symmetrical airfoils (indicated as airfoil shape 58 in FIG. 4) in the positive pitch range, but are very inefficient as "spoilers" in the negative pitch range. The asymmetric wing provides sufficient lift that it may be attached to the chain 16 at a fixed angle. As a carriage 18 carries a wing segment 12 up the ascending track 50, the wing is, ideally, proportioned and positioned to provide a lift to drag ratio of about 1.7, so as to produce a force vector pushing the wing segment up and back at an angle of about 60°. The weight of the carriage 18, it will be noted, is balanced by another carriage 18 on the descending track 52. As the wing segment 12 rounds the upper apex of the frame 14 and starts its descent on track 52, non-aerodynamic (barn door) negative lift forces, as well as drag forces, tend to push the wing segment 12 and its carriage 18 downwardly and rearwardly. These forces, although not as strong as the lift and drag forces on the ascending side, nonetheless add to the efficiency of the LAWT 10.

A variety of other wing profile types can be used with the LAWT system 10. These include asymmetric (cambered) airfoils with slats 34 and flaps 36 as shown in FIG. 6, which provide much greater lift than the plain airfoil of FIG. 6B but add complexity to the system, and cambered airfoils with flaps 36 as shown in FIG. 6A.

Figure 7:
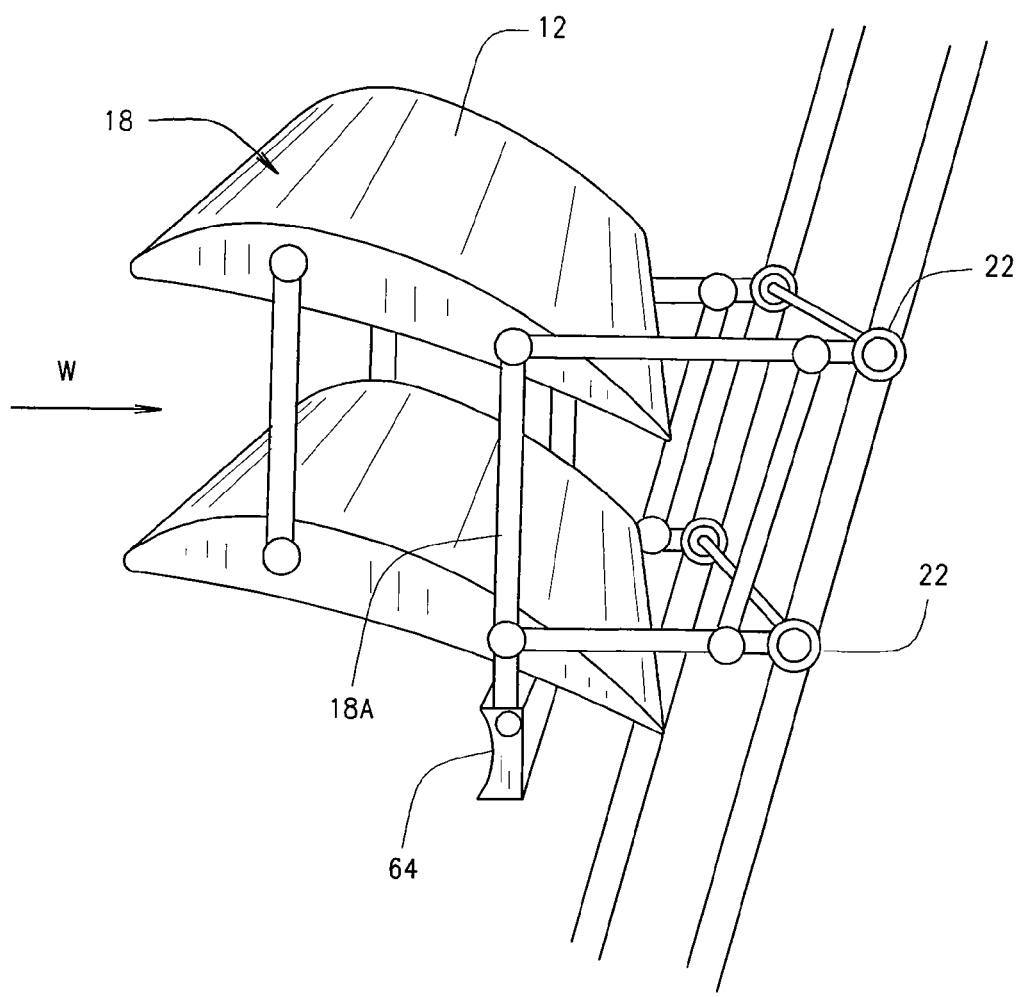
FIG. 7 is a view in perspective of a multiple-wing carriage for use in a LAWT.

Single wing segment carriages 18 typically require up to 4 wheels 22 each. To reduce the total number per one system, it may be advantageous to group 2 or more wheeled wing segments 12 closer together on a single four-wheeled rectangular frame 18A, as shown in FIG. 7. Such airfoil grouping will be aerodynamically similar to old bi-planes or tri-planes, resulting in maximum lift-force density per square meter of the frontal area and overall reduction of moving parts. A four-wheeled rectangular frame 18A serving as a mounting mobile platform for several wing segments 12 could also serve as a mounting platform for a drag enhancement device in the form of a rigid flat plate or hollowed half-cylinder 64 with maximum drag coefficient. The drag enhancement device 64 could supplement the drag of a pitched wing as needed to balance and optimize the combined lift/drag vector direction.

Figure 5B:
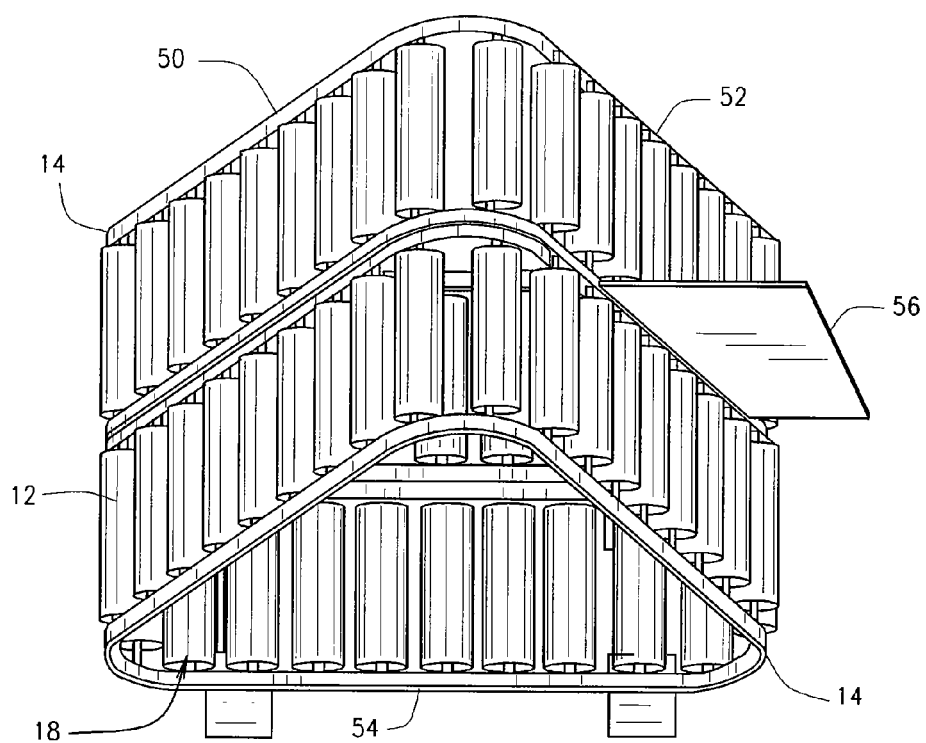
FIG. 5B is a view in upper perspective of a LAWT on a rotating platform, the LAWT having two sets of symmetrical wings to increase its width and a vane to align it to the wind.

The number of wing segment wheeled carriages 12 is limited only by the length of the device's "travel tracks" 50, 52, 54. Each wing segment wheeled carriage 18 is attached at both ends making the construction sturdier and less expensive. The LAWT 10 system is fully scalable, with its height and width being scaled independently. As shown in FIG. 5B, the width of the LAWT system 10 may be increased modularly by forming double, triple, or other multiple units, either placed side-to-side or formed integrally. This capability makes the LAWT suitable for a market ranging from individual small wind machines placed on commercial rooftops or home rooftops (where the geometry of the triangular frame 14 would likely be changed and the return track 54 might not be horizontal) to large utility-sized onshore of offshore arrays.

The LAWT system 10 has a variety of yaw control implementations, alternatives and options. A rudder 56 (FIG. 5B) automatically insures that the LAWT system 10 is always correctly facing the oncoming wind. As an alternative, as shown in FIG. 5, the LAWT system 10 can be mounted off-center on a yaw platform 32 that freely rotates on tires or steel wheels 33 resulting in an automatic yaw forced entirely by wind force alone. This configuration results in substantial cost savings and elimination of critical moving parts required in the conventional technology such as motors, gears and locking mechanisms.

The LAWT 10 system can also be mounted on a pole 35, using either the same off-center mounting principle for yaw control, as shown in FIG. 5A, or a conventional yaw control as used on conventional wind turbines.

Numerous other variations, within the scope of the appended claims, will occur to those skilled in the art.

Merely by way of example, the traveling wheels may be eliminated, and the carriages merely fixed to the chains 16, which are suspended on sprockets at the apexes of a triangle. The sprockets, for example, could be mounted at the ends of the arms of an inverted T-frame. One or both of the lower two sprockets could drive the electric generator directly, without requiring the secondary driving chain. If desired, rather than fixing the wing segments with respect to the chain, a pitch control system for the wing segments could be utilized, either in the form shown in FIGS. 4 and 5, or with a second chain and sprockets supported by the frame.

Other continuous drive belts may be substituted for the chains 16.

The secondary driving chain shown in FIG. 3 could be attached directly to the primary driving chain.

Positive pitch control mechanisms may be provided in combination with cambered wings.

These variations are merely illustrative.

The invention claimed is:

1. A device comprising
a framework defining a generally triangular track having a generally horizontal reach, a front reach sloping rearwardly from an upstream end of the horizontal reach toward an apex, and a rear reach sloping rearwardly from the apex to a downstream end of the horizontal reach,
a plurality of interconnected carriages riding on the track for movement around the track, each of the carriages comprising a wing segment, the wing segments being parallel to each other, the wing segments riding on the front side of the track being positioned to produce lift and drag tending to move the wing segment toward the apex, and
an energy conversion device coupled to the carriages to convert motion of the carriages into another form of energy.

2. The device of claim 1 wherein the track comprises two spaced-apart track segments, and wherein each carriage comprises wheels at the ends of the wing segments, the wheels riding on the track segments.

3. The device of claim 2 wherein the energy conversion device generates electricity.

4. The device of claim 1 wherein the carriages are coupled to each other by a continuous drive member.

5. The device of claim 4 wherein the continuous drive member is a belt or a chain.

6. The device of claim 1 further comprising a mechanism for adjusting the pitch of the wing segments.

7. The device of claim 6 wherein the mechanism for adjusting the pitch of the wing segments causes the wing segments to have a positive pitch when they are on a first side of the frame and a negative pitch when they are on a second side of the frame.

8. The device of claim 1 wherein the wing segment is a symmetric airfoil.

9. The device of claim 1 wherein the wing segment is asymmetric and has a camber chosen to increase lift above that provided by a symmetric wing of the same length, width, and depth.

10. The device of claim 9 wherein the pitch of the wing segments relative to the belt or chain is fixed, whereby the leading edge of each wing segment on the front side of the frame is the trailing edge on the rear side of the frame.

11. The device of claim 1 wherein the carriages are equally spaced from each other, whereby the weight of carriages on the front side of the track substantially balances the weight of carriages on the back side of the track.

12. The device of claim 1 wherein the track is mounted to a rotatable base, the rotatable base allowing the device to rotate in a generally horizontal plane.

13. The device of claim 1 wherein the front side of the track slopes about forty-five to about seventy-five degrees from horizontal.

14. The device of claim 13 wherein the rear side of the track slopes about negative forty-five to about negative seventy-five degrees from horizontal.

15. The device of claim 1 wherein each carriage comprises a plurality of parallel wing segments.

16. The device of claim 1 wherein each carriage comprises structure providing a supplemental drag chosen to produce a lift to drag ratio more closely matching the slope of the front side of the track.

17. The device of claim 3 wherein the apex is oriented above the horizontal reach.

18. A device comprising
a frame having a triangular path,
a plurality of interconnected carriages mounted for movement in the triangular path around the frame, the path having a generally horizontal reach, a front reach sloping rearwardly from an upstream end of the horizontal reach toward an apex, and a rear reach sloping rearwardly from the apex to a downstream end of the horizontal reach,
a plurality of interconnected carriages riding on the track for movement around the track, each of the carriages comprising an aerodynamic wing segment having a spanwise leading edge, the leading edges of the wing segments being generally horizontal and parallel to each other, the wing segments on the front reach of the path being positioned to produce lift and drag tending to move the wing segment toward the apex, and
an energy conversion device coupled to the carriages to convert motion of the carriages into another form of energy.

19. A method of generating electricity comprising coupling to a generator a looped airfoil system comprising a plurality of interconnected parallel wing segments, each wing segment forming an airfoil having a generally horizontal spanwise leading edge, and mounting the wing segments for movement in a frame having a generally vertical, triangular path, the path having a generally horizontal reach, a rearwardly sloping front reach, and a rear reach, each wing segment providing lift and drag when exposed to a fluid flow across the wing segment at least when the wing segment is in the front reach of the path.

\* \* \* \* \*